United States Patent [19]

San Miguel

[11] 4,389,030

[45] Jun. 21, 1983

[54] CANOPY MOSAIC THERMAL BARRIER

[75] Inventor: Anthony San Miguel, Ridgecrest, Calif.

[73] Assignee: The United States of America as represented by the Secretary of the Navy, Washington, D.C.

[21] Appl. No.: 830,545

[22] Filed: Sep. 6, 1977

[51] Int. Cl.³ .......................... B64C 1/14; B32B 7/00
[52] U.S. Cl. ................................ 244/129.3; 244/121; 244/117 A; 428/49; 428/46
[58] Field of Search .............. 244/121, 129.3; 428/45, 428/46, 49, 921; 52/203, 306, 616, 622

[56] References Cited

U.S. PATENT DOCUMENTS

| 2,319,534 | 5/1943 | Crowley | 428/46 |
| 2,464,826 | 3/1949 | Nehes et al. | 244/129.3 X |
| 2,939,186 | 6/1960 | Norwood et al. | 244/121 X |

FOREIGN PATENT DOCUMENTS 6709274 7/1967 Netherlands .......................... 428/46

OTHER PUBLICATIONS

"Thermal Protective Coatings", Perry et al., Mar. 31, 1976, Report No. U-6213.

Primary Examiner—Trygve M. Blix
Assistant Examiner—Rodney Corl
Attorney, Agent, or Firm—Robert F. Beers; W. Thom Skeer; Thomas W. Hennen

[57] ABSTRACT

A heat resisting canopy which utilizes a mosaic overlay of quartz or heat resisting glass elements adhesively bonded to a transparent organic shell. A transparent adhesive bonds each mosaic element to the organic canopy shell. A plurality of metallic ribbons, egg-crated together to form a lattice, stabilizes the mosaic structure, and individual elements are retained by a metallic wire mesh which covers the mosaic layer and which is attached to the canopy shell.

6 Claims, 2 Drawing Figures 4,389,030

CANOPY MOSAIC THERMAL BARRIER

BACKGROUND OF THE INVENTION

1. Field of the Invention

This invention pertains to thermal barriers, and more particularly to transparent thermal barriers for protecting personnel from fire.

2. Description of the Prior Art

Aircraft canopies or the like commonly are made from transparent organic material such as polymethyl methacrylate. This material is more commonly known as plexiglass, a light weight thermoplastic polymer of methyl methacrylate. Aircraft canopies must be sufficiently rigid to withstand wind pressure, and consequently have significant thickness when manufactured of plexiglass. However, plexiglass has a relatively low rate of heat transfer and a relatively large coefficient of thermal expansion, as is characteristic of organic materials. Thus when an aircraft having a plexiglass canopy is exposed to a fire, such as may occur on the deck of an aircraft carrier, the flames heat the outer surface of the canopy and cause it to expand while the inner surface stays cool, thereby inducing thermal stresses in the plexiglass canopy. This results in fracture of the canopy, and exposure of the pilot to the flames.

A canopy made of an inorganic material such as glass, would have improved thermal characteristics but would exact a severe weight penalty on the aircraft. Also, an all glass canopy would present a severe splinter hazard to the pilot if it were damaged by enemy gun fire, or other mechanical or thermal means.

SUMMARY OF THE INVENTION

The problems of excessive weight and fracture danger of an all glass canopy, and the thermal failure danger of an all plexiglass canopy are overcome by the present invention which utilizes a plexiglass shell for strength, and applies a mosaic outer layer of transparent inorganic elements to form a thermal barrier. This invention may be retrofitted to existing aircraft canopies, or may be utilized in the manufacture of new canopies.

Small wafers of inorganic material such as quartz or heat resisting glass of the type commonly known as Pyrex are bonded to the exterior of the canopy by means of a transparent adhesive. The transparent elements are arranged in a mosaic layer to provide a thermal barrier over the contoured plexiglass canopy shell. To ensure retention of the inorganic elements by the plexiglass canopy, a metallic ribbon, which may be copper or the equivalent, is egg-crated to form the lattice and is applied to the canopy to retain the transparent elements within the lattice interstices. Metallic wires, which may be stainless steel or the equivalent, are then attached on one end to the canopy shell and strung across the transparent elements in a grid pattern so as to intersect above each transparent element. The other ends of the wires are then also attached to the canopy shell. This wire mesh further helps to retain the transparent elements during flight if the transparent adhesive should fail. A suitable adhesive may eliminate the need for the metallic ribbon and wire.

DESCRIPTION OF THE PREFERRED EMBODIMENT

Figure 1:
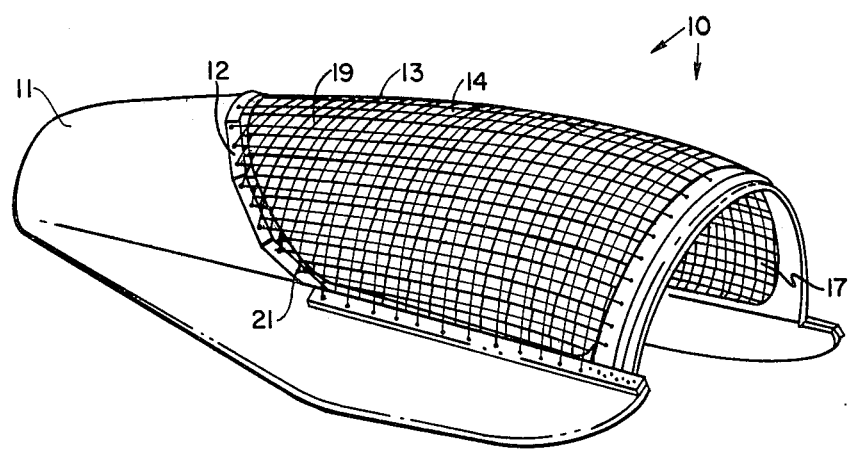
FIG. 1 is a perspective view of a heat resisting aircraft canopy according to the invention.

Referring now to the drawings wherein like reference numerals correspond to like parts and elements through out the several views there is shown in FIG. 1 a heat resisting aircraft canopy generally designated 10. Canopy 10 has transparent organic shell 17 which may be polymethyl methacrylate mounted in frame 11 for attachment to an aircraft.

Figure 2:
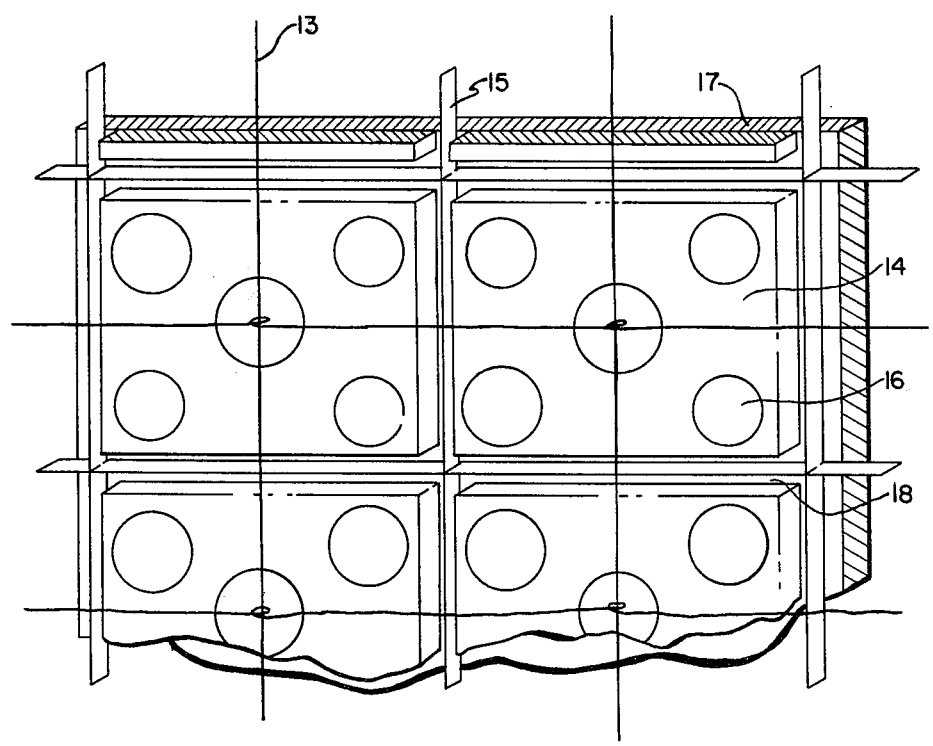
FIG. 2 is a fragmentary view of a section of a heat resisting aircraft canopy.

Transparent organic shell 17 supports a mosaic arrangement of inorganic transparent elements 14 which may be made from quartz or from a high temperature resisting glass such as Pyrex or the equivalent. Elements 14 are bonded to shell 17 by a transparent adhesive, which may be a transparent or translucent silicone rubber adhesive, as shown in FIG. 2 by adhesive spots 16. Transparent elements 14 may further be retained in place by metallic ribbon 15, which may be made from copper or the equivalent, which is egg-crated together to form a lattice surrounding each element 14. The term "egg-crating" refers to the practice of making a transverse cut half way across each of two intersecting metallic ribbons so that when arranged to form an edgewise intersection the ribbons nest together the corresponding edges of the respective ribbons define approximately parallel planes separated by the width of one ribbon.

Metallic wires 13, which may be stainless steel or the equivalent, are laid in a grid pattern over the top of elements 14 to retain them within ribbon lattice 15. The free ends of each wire 13 are retained to frame 11 by retaining bar 12 which may be made of brass or any similar material. Retaining bar 12 is attached to frame 11 around the edge of shell 17. Wires 13 are selected to have small diameters so that a minimum of interference with pilot vision through the canopy is produced. Wires 13 are attached to retaining bars 12 by means of screws 21.

After installation of all transparent elements 14, adhesive sealant, which may be a transparent or translucent silicone rubber, is applied between adjacent elements, as at interstitial area 18, to seal the structure. One or more interstitial areas near the rear of canopy 10, such as at 19, are left unsealed to permit the escape of air when a pressure differential exists between the surrounding environment and the area underneath the mosaic layer. Air trapped beneath the mosaic layer will expand when the aircraft climbs to a higher altitude or when this air is heated as by a fire. By venting this air, pressure stresses on the mosaic layer are greatly reduced. Interstitial vent 19 would be unnecessary if means were provided for evacuating all air from beneath the mosaic layer during manufacture and a perfect seal attained.

A more detailed description of the assembly technique for a canopy mosaic thermal barrier is given in a technical report describing the actual reduction to practice of this invention. This report, which is unclassified and available to the public from the National Technical Information Service, Springfield, Virginia 22161 under accession number AD:A031035, is entitled Report Number U-6213 Thermal Protective Coatings. It gives a more thorough discussion of the manufacturing technique.

Of course, the canopy mosaic is best suited for retrofit application to an existing aircraft canopy. New canopies may be constructed with one or more inorganic transparent elements applied as a outer coating to the plexiglass. Such a composite laminated canopy would retain the weight and strength benefits of plexiglass while adding the thermal benefits of quartz or Pyrex on the outer surface. Abrasion resistance also would be improved.

A canopy mosaic thermal barrier such as previously described was constructed by first cleaning shell 17 with soap and water and then with ethyl alcohol. Pyrex or quartz squares approximately 2 inches by 2 inches (5.08 by 5.08 centimeters) and 0.125 inch (0.32 centimeter) thick were bonded to the plexiglass at 5 points, one in each corner of each square, and one in the center of each square, with RTV108 silicone rubber made by General Electric Corporation or any equivalent material. RTV108 was chosen for its bonding, translucent and heat resistant properties.

Bonding the Pyrex or the quartz squares to the plexiglass, a minimum gap of 0.030 inch (0.076 centimeter) was maintained between each square to allow for thermal expansion of the square. Larger gaps resulted in some places because the curvature of the plexiglass prevented each square from completely lining up with the squares on each side.

A brass rod 1 inch (2.54 centimeter) wide and ¼ inch (0.635 centimeter) thick was mounted around the plexiglass and held in place by some of the bolts that hold the plexiglass in place. Holes were drilled in the brass rod and threaded for screws to hold the safety wire in place.

When the brass rod, Pyrex or quartz squares, and cut Pyrex or quartz squares, which were made to fill in the area between the brass rod and the full squares, were in place, 0.002 inch (0.005 centimeter) copper strips, cut to the thickness of the Pyrex, where placed in the gaps between the Pyrex squares. The spaces between the Pyrex squares running from the front of the overlay to the rear are all in line, so a copper strip was cut to size and to the curvature of the plexiglass from the brass rod or retaining bar 12 in front, to the brass rod or retaining bar 12 in the rear for each row of gaps running lengthwise. For the gaps between the squares running from one side to the other, 2 inch (5.08 centimeter) copper strips were used.

The procedure for putting the copper strips in place is as follows: first, a small bead of RTV108 silicone rubber was placed in the gap and the copper strip was set in place. Then another bead of RTV108 was run along the gap trying to partially fill it. This was accomplished by the use of a SEMCO airgun having a small opening, though any equivalent tool may be used. When the silicone rubber had fully cured, the excess was cut off by means of a razor blade. The entire overlay was sealed except for openings left in the rear to allow for escaping air.

The final step in the canopy construction process was to install 0.015 inch (0.038 centimeter) stainless steel safety wire. This was accomplished by attaching the wire to the screws provided on the brass strip or brass rod or retaining bar 12. One wire was strung for each row of Pyrex squares running lengthwise and from one side to the other. At each intersection of wire, one wire was looped around the other to hold them in place. As a final touch the brass strip or retaining bar 12 was cleaned and coated with a clear polyurethane.

Image distortion when viewed from inside the completed cockpit, was apparent; however, this could be significantly reduced by using a one or two piece preform Pyrex or quartz canopy overlay instead of individual squares, resulting in a laminated plexiglass and glass or quartz structure having fewer joints and having preforms shaped to match canopy contours.

What is claimed is:

1. A heat resisting canopy, comprising:
    a transparent shell made from an organic material, and defining a convex outer surface and a concave inner surface;
    a plurality of transparent elements made from an inorganic material and arranged upon said convex outer surface in the form of a transparent element mosaic outer layer;
    a transparent adhesive material joining each of said transparent elements to said transparent shell;
    a plurality of metallic ribbons arranged on said transparent shell convex outer surface to form a metallic ribbon lattice, wherein each of said transparent elements is bounded by a portion of said metallic ribbon lattice; and
    a plurality of metallic wires arranged over said transparent element mosaic outer layer to form a grid, wherein said grid defines a central intersection on each of said transparent elements, each metallic wire of said plurality of metallic wires having two ends, and each end of each wire being attached to said canopy.

2. A heat resisting canopy as set forth in claim 1 wherein said organic material is polymethyl methacrylate.

3. A heat resisting canopy as set forth in claim 1 wherein said inorganic material is quartz.

4. A heat resisting canopy as set forth in claim 1 wherein said inorganic material is a heat resisting glass.

5. A heat resisting canopy as set forth in claim 1 wherein said transparent adhesive material is a transparent silicone rubber adhesive.

6. A heat resisting canopy as set forth in claim 1 wherein said metallic ribbons comprise copper, and said metallic wires comprise stainless steel.

* * * * *